June 22, 1937.  A. W. TRONNIER  2,084,714
UNSYMMETRICAL PHOTOGRAPHIC OBJECTIVE
Filed Oct. 25, 1935
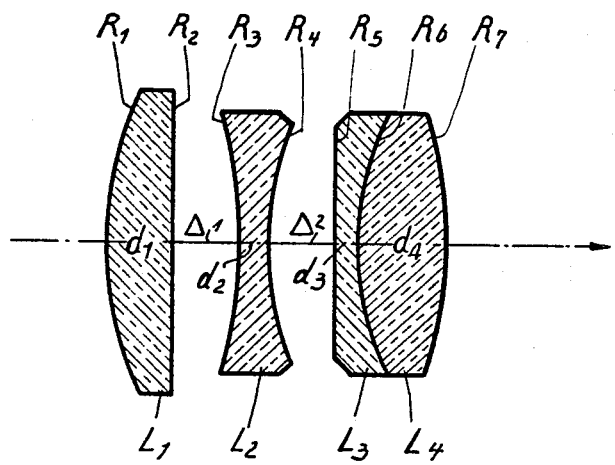
Inventor,
Albrecht W. Tronnier,
By Sommers & Young.
Attys.

Patented June 22, 1937

2,084,714

UNITED STATES PATENT OFFICE 2,084,714

UNSYMMETRICAL PHOTOGRAPHIC OBJECTIVE

Albrecht Wilhelm Tronnier, Bad Kreuznach, Germany, assignor to the Corporation of Jos. Schneider & Co., Optotechnische Gesellschaft, Berlin, Germany Application October 25, 1935, Serial No. 46,809
In Germany August 26, 1935

1 Claim.   (Cl. 88—57)

This invention relates to an unsymmetrical photographic objective consisting of two individual lenses and two cemented-together lenses, so that six air-contacting surfaces are provided. The two individual lenses which face the incident light are of opposite algebraic sign and are so positioned that the collective lens is in front and is followed by the dispersive lens which is formed as a bi-concave lens, so that an intermediate dispersive air space is included between them and so as together to produce a dispersive or at most a slightly collective effect. The two remaining lenses are combined into a composite component having strongly collective properties and unsymmetrical exterior surfaces through agency of a cemented surface the radius of curvature of which is equal to at least 80 per cent of the effective aperture diameter of the objective.

This lens construction when accompanied by suitable sequential choice of lens glass is particularly suited for obtaining good spherical correction even for large relative apertures and an anastigmatic image plane extending over a relatively large image field, within which, in general, the aberrations of the sagital and meridional image surfaces can be kept below about 1 per cent of the focal length. In order to facilitate the industrial manufacture thereof the condition which must be fulfilled and which is inherent in the lens of the invention is that of keeping the sum of the absolute lengths of both radii of curvature of the object-facing individual lenses and of the image-facing outer radius of the cemented rear component within 80 per cent of the total focal length as a lower limit.

It is an object of the invention to produce particularly good zonal correction especially in the marginal portions of the image field so that by means of the invention images may be obtained having good central as well as marginal definition and whereby, even when great light intensity is involved, e. g. at relative apertures of about $f$ 3.5, the zonal aberrations of the sagital and meridional image surfaces are not merely, as in hitherto known systems of this type, reduced to an amount equal to 1 per cent of the focal length but are in fact reduced below this limit or appreciably below .5 per cent of the focal length with the accompaniment of desirable chromatic and comatic corrections.

The objective of the invention is fundamentally so built up that the collective system located on the smaller radiating side and regarded photographically as the rear component has a greater positive refractive power than the entire objective and at the same time embraces a collective cemented surface in respect of which there exists a yellow ray refractive exponent difference of more than .06. The collective lens disposed on the other side of the unsymmetrical dispersive lens is made of a glass the refractive index of which is greater, by an amount equal to at least ⅓ the refractive exponent difference prevailing at the cemented surface, than the refractive index value for the same color at the interiorly disposed dispersive lens.

The object of the invention is achieved by so arranging the herein described type of lens that the outer radius $R_1$ of the front lens on its greater radiating side is greater by 52½ per cent, calculated in absolute values, than that of the flatter hollow radius $R_3$, facing the front lens, of the interiorly positioned dispersive lens and that in addition, simultaneously, the central thickness $d_1$ of the front lens and of the air space $\Delta_1$ between this lens and the succeeding dispersive lens is greater than 52½ thousandths of the total focal length of the objective.

The accompanying drawing illustrates diagrammatically an objective constructed in accordance with the invention, and having a focal length of 200 millimeters, the annexed table giving all indicia for the focal length expressed as unity, the legends corresponding to the example shown in the drawing.

| | | | |
|---|---|---|---|
| $R_1=+0.3242$ | $d_1=0.0599$ | $n_1=1.6202$ | $\nu_1=60.0$ |
| $R_2=-5.7980$ | $\Delta_1=0.0655$ | Air | |
| $R_3=-0.5850$ | $d_2=0.0288$ | $n_2=1.5785$ | $\nu_2=42.3$ |
| $R_4=+0.2761$ | $\Delta_2=0.0655$ | Air, (diaphragm space) | |
| $R_5=-5.7980$ | $d_3=0.0215$ | $n_3=1.5315$ | $\nu_3=49.1$ |
| $R_6=+0.2618$ | $d_4=0.0879$ | $n_4=1.6202$ | $\nu_4=60.0$ |
| $R_7=-0.4236$ | | | |

The relative aperture of this constructional example, wherein refractive indicia are given for the yellow ray, is $f$ 3.5 for a useful visual field of over 50° within which the greatest astigmatic zonal aberration occurs at an image-side principal ray inclination of 19° 38′ 44.6″ (corresponding to an inclination of 23° thereof in the diaphragm space). The sagital image point in this case lies about .393 per cent and the meridional image point about .347 per cent of the focal length in front of the ideal Gauss image plane.

What is claimed is:

An unsymmetrical photographic objective having six air-contacting surfaces and which is built up of an unsymmetrical dispersive lens embraced between two collective components and behind which dispersive lens the diaphragm is located, the structure being such that the collective component disposed on the rear and smaller radiating side of said dispersive component facing the image embraces a collective cemented surface the radius of curvature of which is equal to at least 80 per cent of the effective aperture diameter, and to which is assigned a refractive index difference of at least .06, whereas on the front side of the dispersive lens facing the incident light is disposed a single collective lens the refractive index of which is greater, by at least ⅓ the refractive exponent difference prevailing at the cemented surface, than the refractive index value for the same color prevailing at the interiorly disposed dispersive lens, characterized by the fact that the outer radius of the front lens on the greater radiating side is greater than 52½ per cent (according to its absolute value) of the flatter hollow radius $R_3$ (facing the front lens) of the interiorly disposed dispersive lens and that in addition at the same time the central thickness $d_1$ of the front lens and of the air space separation $\Delta_1$ between this lens and the succeeding, dispersive, lens is greater than 52½ thousandths of the total focal length of the objective.

ALBRECHT WILHELM TRONNIER.